(12) United States Patent
Zorn (10) Patent No.: US 8,468,513 B2
(45) Date of Patent: Jun. 18, 2013

(54) SPECIFICATION, ABSTRACTION, AND ENFORCEMENT IN A DATA CENTER OPERATING SYSTEM

(75) Inventor: Benjamin Zorn, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 958 days.

(21) Appl. No.: 12/013,940

(22) Filed: Jan. 14, 2008

(65) Prior Publication Data

US 2009/0183146 A1 Jul. 16, 2009

(51) Int. Cl.
*G06F 9/44* (2006.01)
*G06F 15/177* (2006.01)

(52) U.S. Cl.
USPC .............................................. 717/168; 713/2

(58) Field of Classification Search
USPC .......................................................... 707/747
See application file for complete search history.

(56) References Cited

U.S. PATENT DOCUMENTS

| | | | | |
|---|---|---|---|---|
| 6,760,748 | B1 * | 7/2004 | Hakim ........................... | 709/204 |
| 7,080,143 | B2 * | 7/2006 | Hunt et al. .................... | 709/224 |
| 7,853,961 | B2 * | 12/2010 | Nori et al. ....................... | 705/30 |
| 2006/0080656 | A1 * | 4/2006 | Cain et al. ..................... | 717/174 |
| 2006/0090136 | A1 * | 4/2006 | Miller et al. .................. | 715/734 |
| 2006/0282886 | A1 * | 12/2006 | Gaug ................................ | 726/5 |
| 2007/0169083 | A1 * | 7/2007 | Penubolu et al. ............. | 717/168 |
| 2008/0027780 | A1 * | 1/2008 | Greenstein ........................ | 705/8 |
| 2009/0083408 | A1 * | 3/2009 | Hecht et al. .................... | 709/223 |
| 2009/0089567 | A1 * | 4/2009 | Boland et al. ..................... | 713/2 |
| 2010/0299232 | A1 * | 11/2010 | Nathan et al. ................... | 705/30 |
| 2010/0318658 | A1 * | 12/2010 | Zorn et al. ..................... | 709/226 |

OTHER PUBLICATIONS

Author: Mahesh Kallahalla, Mustafa Uysal, Ram Swaminathan, Dadic E. Lowell, Mike Wray, Tom Christian, Nigel Edwards, Chris I. Dalton, Frederic Gittler Title: A Software_Fased Data Center for Utility Computing Date: Nov. 2004; vol 37, issue 11, pp. 38-46, Publisher: IEEE.*

* cited by examiner

*Primary Examiner* — Don Wong
*Assistant Examiner* — Mohammad Kabir
(74) *Attorney, Agent, or Firm* — Lee & Hayes, PLLC (57) ABSTRACT

An exemplary data center architecture includes a services abstraction, a data sources abstraction, an internal applications abstraction and a core administration abstraction for static and dynamic enforcement of data center polices based on compliance with a property set, a specification set or a property set and a specification set. Such an architecture can include a core administration abstraction with logic to install services and to upgrade services in a data center where a service must comply with the property set and the specification set prior to installation of the service or upgrade of the service in the data center. Various other devices, systems and methods are also described.

18 Claims, 9 Drawing Sheets

SPECIFICATION, ABSTRACTION, AND ENFORCEMENT IN A DATA CENTER OPERATING SYSTEM

BACKGROUND

Large scale data centers are a relatively new human artifact, and their organization and structure has evolved rapidly as the commercial opportunities they provide has expanded. Typical modern data centers are organized collections of clusters of hardware running collections of standard software packages, such as web servers database servers, etc. interconnected by high speed networking, routers, and firewalls. The task of organizing these machines, optimizing their configuration, debugging errors in their configuration, and installing and uninstalling software on the constituent machines is largely left to human operators.

Moreover, because the Web services these data centers are supporting are also rapidly evolving (for example, a company might first offer a search service, and then an email service, and then a Map service, etc.) the structure and organization of the underlying data center architecture might need to be changed accordingly. This reorganization is also largely left to human architects to figure out. One problem data center operators currently face is deciding when a service being offered by a data center is no longer needed and can be turned off. The knowledge of why a piece of software is installed, or what other software uses that software, is largely maintained in the fragile memory of the human architects and operators.

Various exemplary technologies described herein pertain to architecture and management of data centers. Various technologies can address one or more of the aforementioned problems or other problems associated with data centers.

SUMMARY

An exemplary data center architecture includes a services abstraction, a data sources abstraction, an internal applications abstraction and a core administration abstraction for static and dynamic enforcement of data center polices based on compliance with a property set, a specification set or a property set and a specification set. Such an architecture can include a core administration abstraction with logic to install services and to upgrade services in a data center where a service must comply with the property set and the specification set prior to installation of the service or upgrade of the service in the data center. Various other devices, systems and methods are also described.

DESCRIPTION OF DRAWINGS

Non-limiting and non-exhaustive examples are described with reference to the following figures.

DETAILED DESCRIPTION

As mentioned in the Background section, various issues exist in management of data center operations. For example, in the same way that software engineering researchers attempt to "discover" the architecture of complex software systems after the fact (sometimes called software archaeology), the organizing principles of large data centers may have evolved so much over time that even the architects themselves do not fully understand the organization of such a system.

Even more problematic for such systems is the inability of anyone associated with the system to be able to provide guarantees about specific properties beyond the most simple. For example, without installing a hardware firewall, it might be very difficult to guarantee that some subset of machines in a data center does communicate with another subset of machines.

As described herein, various exemplary techniques apply principles of abstraction and specification to data center operation. An exemplary technique for data center organization includes a core administration component, which can act as an "operating system" for an entire data center. Such an approach includes defining strong abstractions and using various techniques for specification, static checking, and runtime enforcement that can to some degree ensure that the specifications are met. An exemplary core administration component or module can provide at least some assurances without a need for human intervention.

An exemplary approach to data center management and organization uses strong abstractions, declarative specifications and system properties, and static and dynamic enforcement. In various examples, a core administration module relies on strong abstractions and maintains properties and specifications for static and dynamic enforcement of policies. Such a core administration module can include automated tools to guarantee properties and ensure consistency and can include declarative configuration information to optimize data center performance.

Figure 1:
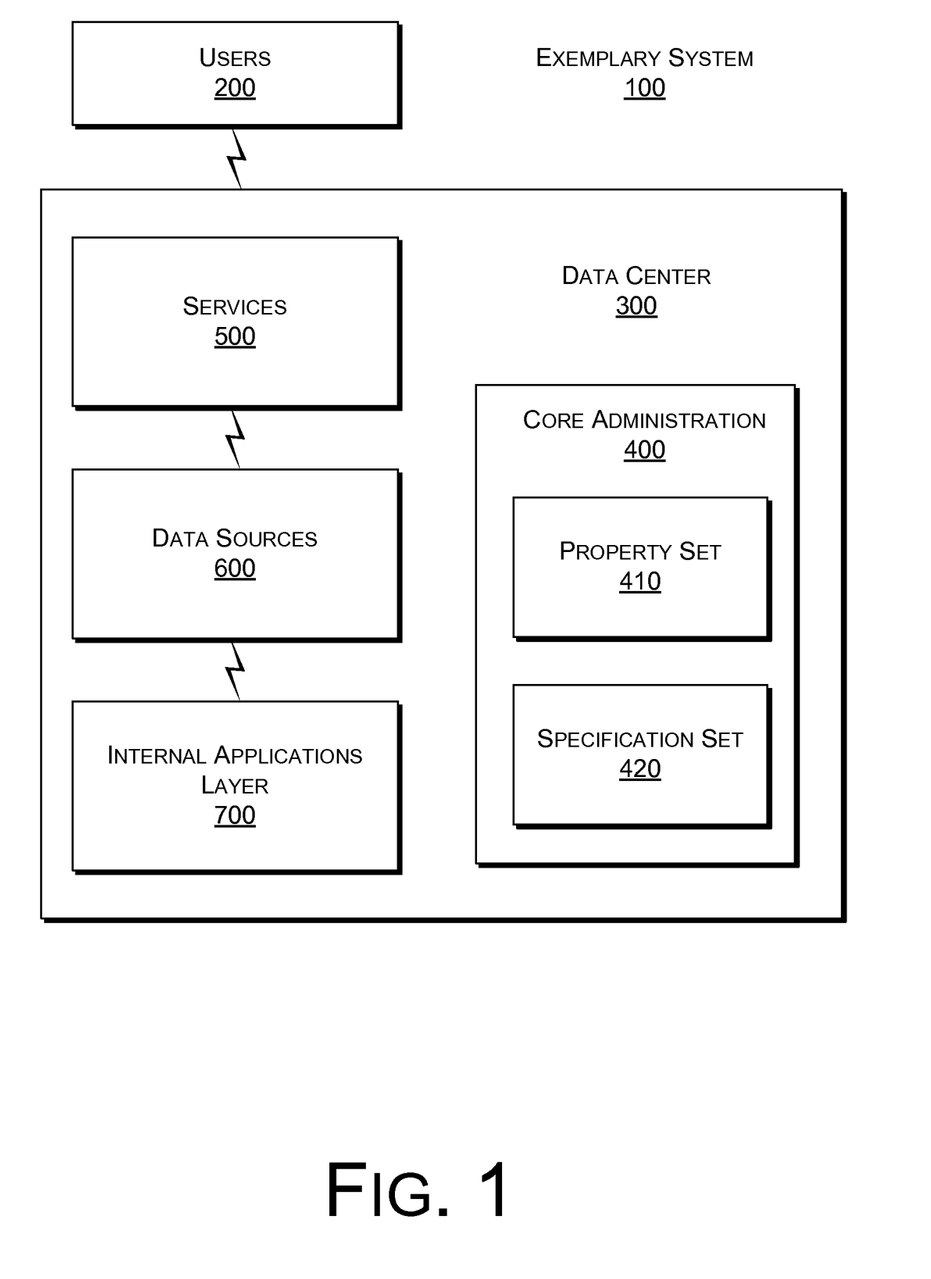
FIG. 1 is a block diagram of an exemplary system that includes a data center.

FIG. 1 shows an exemplary system 100 that includes users 200 and a data center 300. The users 200 may communicate with the data center 300 in any of a variety of manners. For example, users 200 may communicate with the data center 300 over a network such as the Internet or an intranet. The data center 300 may include any of a variety of hardware (e.g., a network, routers, a hardware firewall, etc.) and software components, some of which are shown in FIG. 1.

In the example of FIG. 1, the data center 300 relies on abstractions. In particular, abstractions include a core administration module 400 that maintains a property set 410 and a specification set 420 as well as services 500, data sources 600 and internal applications layer 700. In this arrangement, the core administration module 400 may be referred to as a kernel, somewhat analogous to a kernel of a single computer operating system.

With respect to abstractions, the core administration module 400 functions as a data center OS, for example, implemented on a machine or cluster of machines which are designed as the "secure base" of the entire data center 300.

This machine (or machines) is responsible for managing services 500, resources 600 and applications layer 700 that run in the data center 300. The core administration module 400 is the entity that is responsible for owning, checking, and enforcing the properties 410 and specifications 420 that form the basis for the data center management.

The services 500 can be one or more services where a service can be a set of APIs that allow external clients (e.g., users 200) to request functionality from the data center 300. A service may be APIs provided by databases (e.g. queries), mail, and Web servers.

The data sources 600 maintain data accessible by the services 500. Data sources 600 can include traditional file systems, databases, mail repositories, etc. A data center may have multiple tiers with, for example, a front-end tier (an external facing part of the data center) implemented as stateless Web servers and a back-end tier containing all the state (e.g., customer info, product data, account information, etc.).

As shown in FIG. 1, the core administration module 400 relies on a property set 410 and a specification set 420. Most services 500 require some data sources 600 for their function. An email service requires access to an email repository. A Web server has to have page content to post. Such dependencies can be categorized along familiar lines (e.g., read-only, read-write), as well as partial dependencies can be specified (e.g., an HTML service has read-only permission only to a group records in a specified records database). While the services block 500 represents particular types of services, in general, the term "service" can refer to various components of a data center, including data sources, internal applications, runtimes, etc.

One or more of the services 500 can depend on other services, and sometimes on services offered by other data centers. Such dependencies can be described in a declarative specification (e.g., the specification set 420) written in a formal language that can be checked using automatic static analysis techniques. The language that describes these dependences can be quite rich yet still optionally implemented using conventional techniques to both describe and check dependences between program modules. A specification can be alternatively implemented in a purely operational (not declarative) manner, for example, where compliance checking occurs at runtime. In yet another alternative, a specification may rely on a combination of a declarative specification and an operational runtime specification.

With respect to an operational specification, such a specification may be implemented as code in an appropriate language that allows for checking to occur at runtime. Such an approach provides a form of abstraction and enforcement that can be programmed to output any of a variety of information to help manage a data center.

The internal applications layer 700 can be used by a data center owner, for example, to manipulate data in the data center 300. The internal applications layer 700 may include applications to extract information about stored data. For example, a search data center will process its large collection of stored Web pages to build indices. The internal applications layer 700, can include applications like those associated with a traditional operating system and can be supported by an application runtime that allows them to extract, process, and generate new data with support for scalability, fault tolerance, etc.

Figure 2:
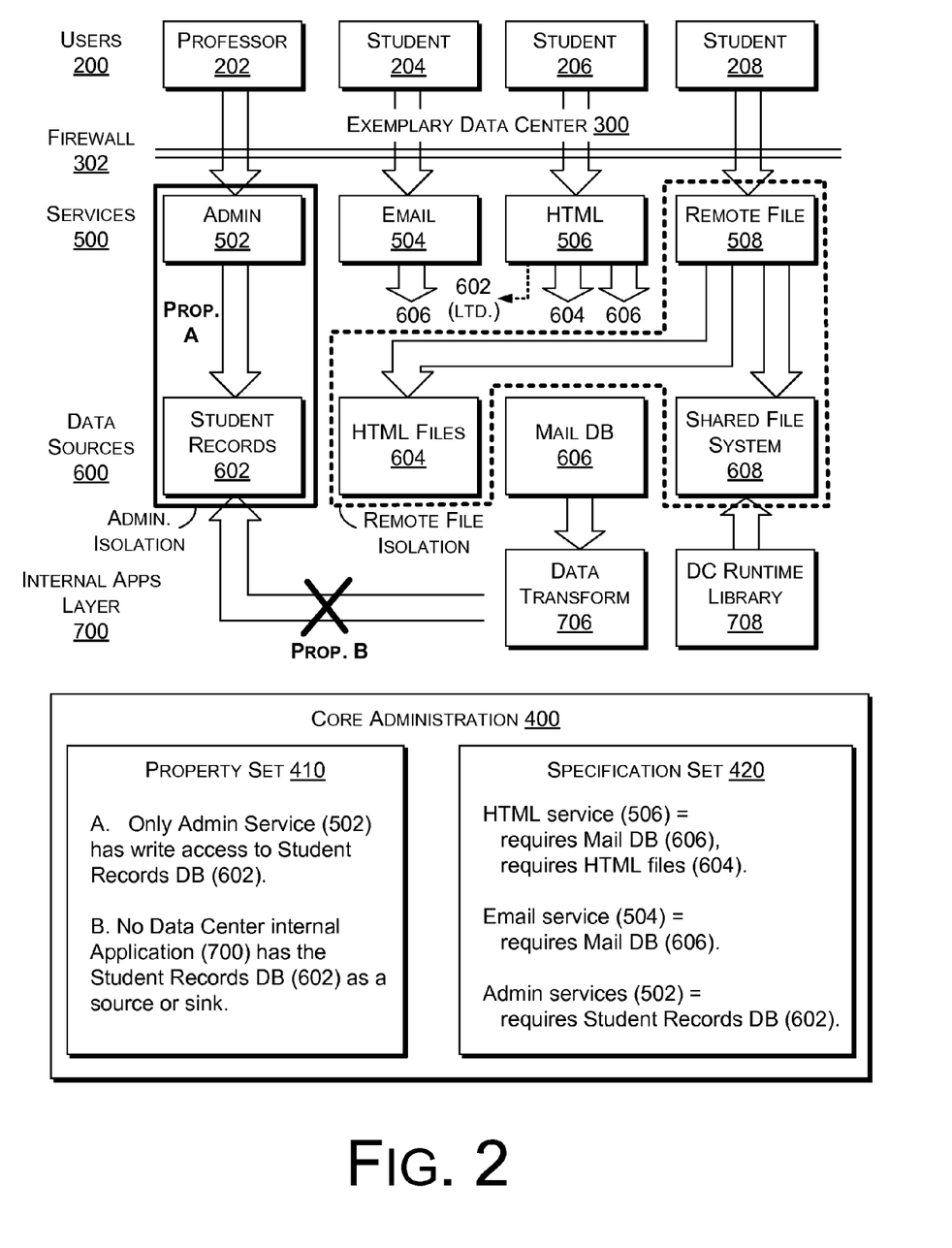
FIG. 2 is a block diagram of an exemplary data center that includes a core administration module.

In the example of FIG. 2, which is described in more detail further below, the internal applications layer 700 includes a data transformation application 706 and a data center runtime library 708. The data transformation application 706 may transform data in the mail database 606 for any of a variety of purposes. The data center runtime library 708 is a library used by data center internal applications such as the data transformation application 706 to support their execution. The DC runtime library 708 may provide mechanisms that allow data center internal applications to access data distributed across machines in a data center, handle cases where specific sub-jobs of a large data transformation operation fail, and possibly load-balance work across multiple machines in a data center.

The internal applications layer 700 can have some of the services 500 and/or data sources 600 serve as inputs while other of the data sources 600 might be outputs. For example, an internal application might read all messages in an email database and generate a list of senders of that email which is then made available as a file in a shared filesystem. Just as with the services 500, the behavior of the internal applications layer 700 can be specified using formal methods and conformance can be checked either statically or dynamically. For example, an exemplary data center may specify the following: "No internal application can take a Records Database as a source and produce a result stored in a Shared Files repository."

FIG. 2 shows a system where various users 200 can interact with an exemplary data center 300. In the example of FIG. 2, the data center 300 includes a firewall 302, a core administration module 400, services 500, data sources 600 and the aforementioned internal applications layer 700. As shown, the users 200 can access the services 500 of the data center 300 through the firewall 302, which may be used as a security layer. In FIG. 2, the data center 300 is a university data center that serves to illustrate interactions between various components.

The users 200 include a professor 202 and three students 204, 206 and 208, where the professor 202 and the students 204, 206 and 208 have different types of accounts or permissions with respect to the data center 300.

The services 500 include an administrative service 502, an email service 504, an HTML service 506 (e.g., Web page service) and a remote file service 508. These services are visible to external users as for example, email 504, Web pages 506, remote files 508, and a remote administrative service 502 that can be used by professors to update the student records, enter grades, etc.

In the example of FIG. 2, data sources 600 include a student records data source 602, an HTML files data source 604, a mail DB 606 and a shared file system 608. Each of the services 502, 504, 506 and 508 is associated with a respective data source 602, 604, 606 and 608.

Some of the data sources are optionally used by different services. Consider the specific case where the remote file service 508 has not been created yet. An exemplary method can include adding of a remote file service. A description of such a method is given further below, which helps to illustrate the types of issues addressed when a new service is added.

As mentioned, the core administration module 400 maintains a property set 410 and a specification set 420 of all the specifications of the installed services, internal applications, data sources, etc. Whenever the data center 300 configuration changes, the module 400 can check that the specification set 420 remains internally consistent (e.g., that removing a data source does not prevent a service that requires it from functioning).

With respect to the property set 410, this set describes properties that the data center administrators have deemed important. These properties form the basis for managing the data center 300 and, for example, allowing automated tools to guarantee that the entire data center remains consistent with respect to issues related to security, privacy, reliability, and performance.

While various examples described herein list properties in terms of English language, in practice these would be specified in an unambiguous formal language that can be automatically checked against a specification using, for example, automated proof techniques such as theorem proving and model checking.

In the example of FIG. 2, properties to enforce can include: "Users 200 of the remote file service 508 cannot access the Student Records Database 602"; "The Student Records Database 602 is only accessible from the Admin service 502 and from no other service"; "Data center applications such as data transformation application 706, which may include the data center runtime library 708, never have the Student Records Database 602 as a source".

Examples of more complex policies related to partial service installation include: "A partially installed service upgrade always returns the same results on existing requests as the original service"; "A partially installed service upgrade never modifies permanent data when its results differ from the results of the original service". FIGS. 5, 6, 7 and 8 describe additional examples of partial operations.

While the example of FIG. 2 clearly shows what services 500 use what data sources 600, in a real data center answering such a simple question can be a difficult task. Each of the services typically involves thousand of lines of code and what sockets this code connects to using what protocols often can only be determined by inspecting all of the code. Because code may be loaded dynamically at runtime, often it is difficult to be completely certain via static inspection whether a particular program makes a specific call to a system function.

It is not unusual that when a new service is added (e.g., the Remote File Service 508), data center operators guess at the impact of the addition on other services, and then see what happens. In the example of FIG. 2, because HTML files 604 can be accessed either for reading or writing (assuming the HTML service is being used largely to post web pages) the file system in which the HTML files are stored may experience increased load. Furthermore, because access to web pages is mostly read-only, the write traffic from those files from the Remote File Service 508 might cause substantial performance bottlenecks not seen before.

Another major concern when a new service is added is that it might directly or indirectly provide access to data that should not be accessible. Accordingly, the exemplary core administration module 400 can provide strong guarantees that the Remote File Service 508 cannot under any circumstances access the Student Records database 602. In contrast, most current organizational approaches only allow this kind of guarantee by using hardware isolation (e.g., placing them on physically disconnected networks).

The exemplary data center 300 relies on the definition of several abstractions. With these abstractions, a data center can be defined in terms of formally defined and verifiable specifications, which can be enforced either statically or at runtime. By having access to declarative information, data center implementation itself can be automatically optimized and reconfigured without human intervention based on how the configuration changes over time.

Figure 8:
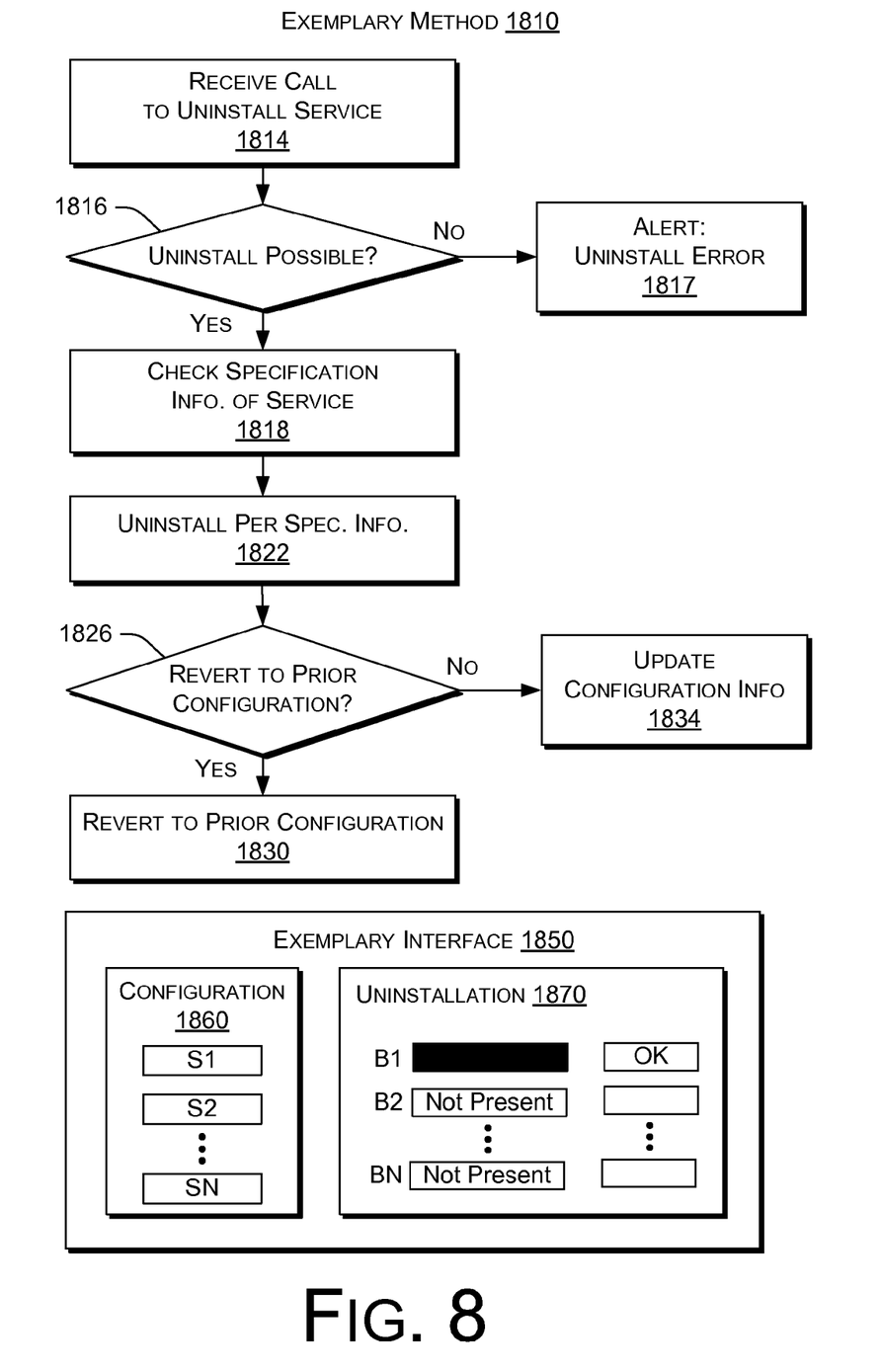
FIG. 8 is a block diagram of an exemplary method and interface (e.g., GUI) for uninstalling a service on a data center.
Figure 9:
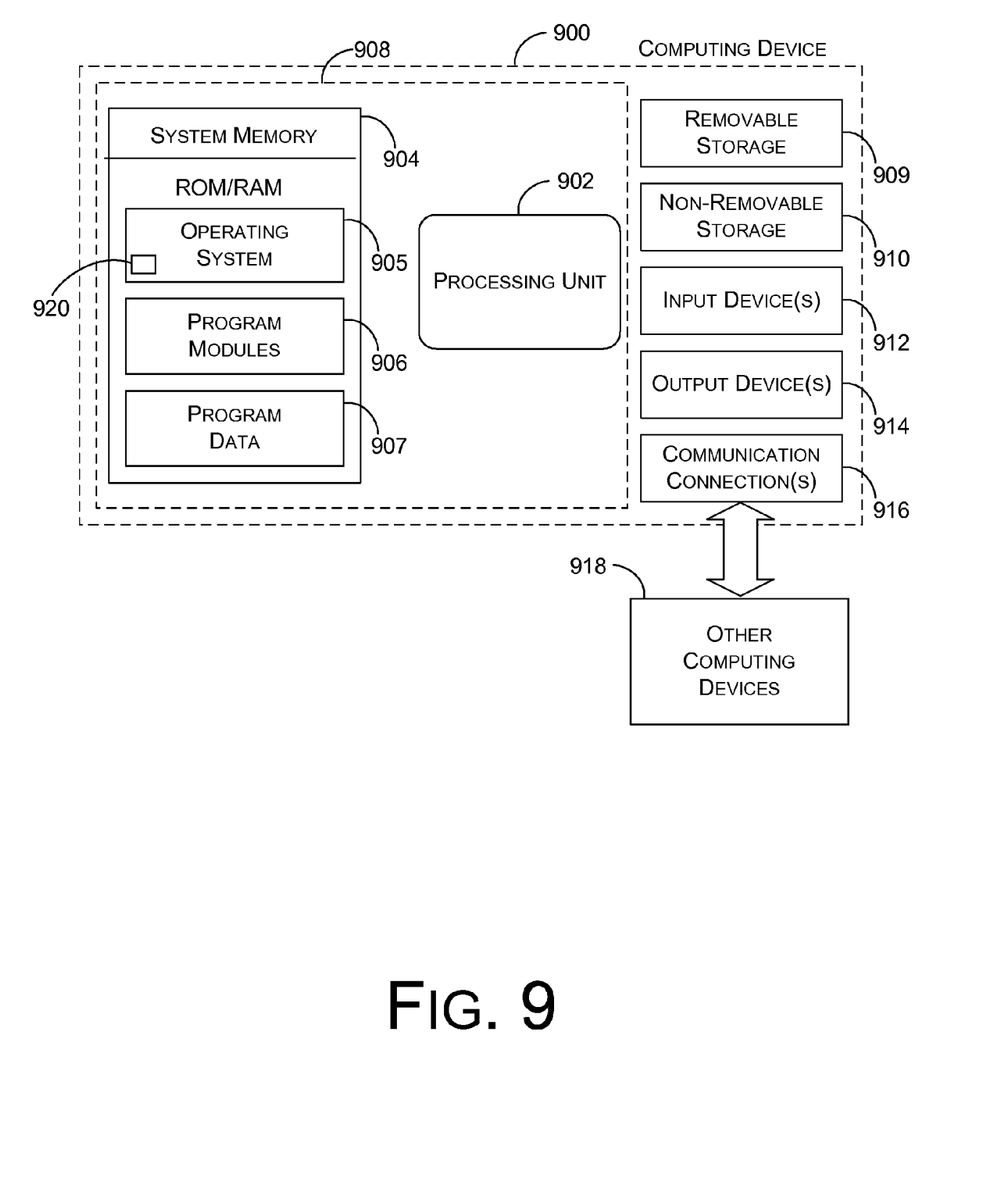
FIG. 9 is a block diagram of an exemplary computing device.

The description that follows pertains to inter-data center operations (FIG. 3), management of connections in a data center (FIG. 4), partial operations with respect to data center resources (FIGS. 5-8) and a computing environment that can be used in a data center (FIG. 9).

Figure 3:
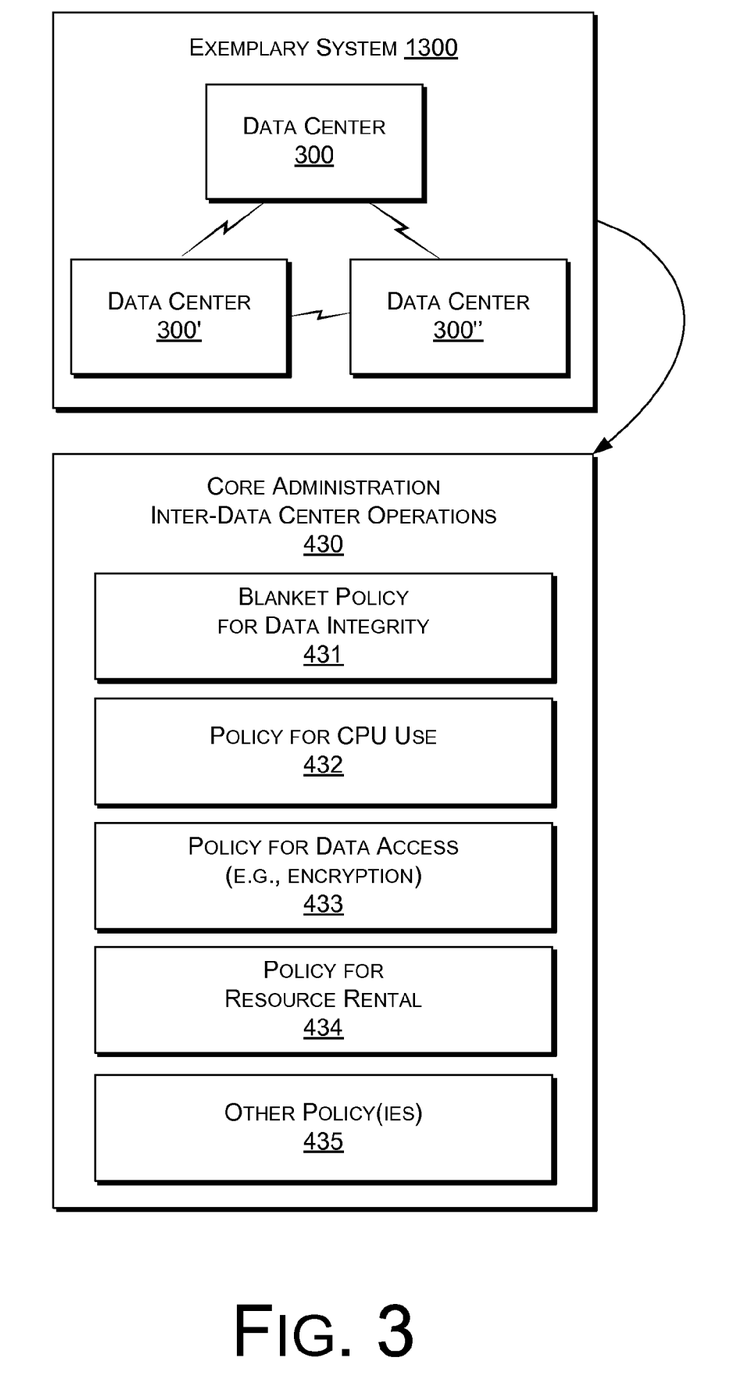
FIG. 3 is a block diagram of an exemplary core administration module for inter-data center operations.

FIG. 3 shows an exemplary system 1300 that includes a plurality of data centers 300, 300' and 300". The data centers 300, 300' and 300" are in communication via one or more networks. According to a core administration inter-data center operations module 430, various policies dictate how communication and resource utilization may occur between data centers 300, 300' and 300".

The module 430 includes a blanket policy 431 for data integrity, a policy for CPU use 432, a policy for data access 433, a policy for resource rental 434 and one or more other policies 435. The policy 431 can maintain data integrity by prohibiting inter-data center writing of data. For example, the data center 300 may access data in data center 300' but not write data or overwrite data to the data center 300'. The policy 432 allows one data center to request and use CPU resources in another data center. The policy 433 pertains to data security and requires encryption for data access (e.g., data transmission). The policy 434 may operate in conjunction with one or more other policies and may provide terms for cost of resources, time of resource rental, etc.

With respect to policies, a policy may be included for any of a variety of resources that need to be, or benefit from, being constrained and/or managed. For example, one or more policies may apply to resources such as disk space, network or I/O bandwidth, memory usage, etc.

Figure 4:
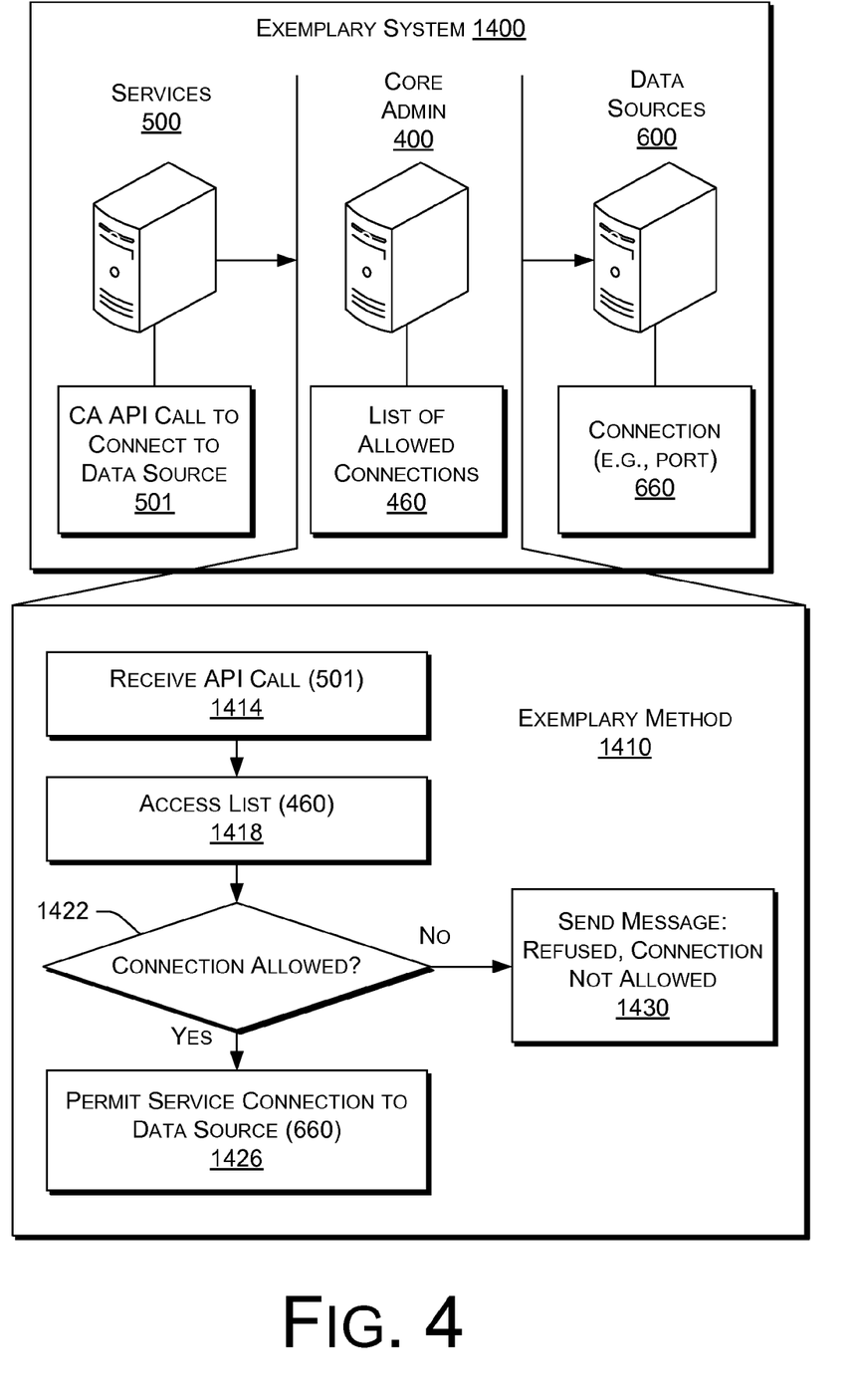
FIG. 4 is a block diagram of an exemplary system and method for managing connections via core administration API calls.

FIG. 4 shows an exemplary system 1400 and an exemplary method 1410 for determining whether a connection is allowed based on a specification. The system 1400 includes services 500, a core administration module 400 and data sources 600. In the example of FIG. 4, one of the services 500 relies on a core administration (CA) API call 501 to connect to a data source, the core administration module 400 maintains a list of allowed connections 460 and one of the data sources has a particular connection (e.g., port) 660.

According to the method 1410, in a reception block 1414, the core administration module 400 receives the API call 501. In an access block 1418, the core administration module 400 accesses the list 460 of allowed connections. A decision block 1422 follows where the core administration module 400 decides if the API call 501 requested a connection that is in the list 460. If the decision block 1422 decides that the connection is not in the list 460, then the method 1410 enters a send block 1430 that sends a message to the service (e.g., "Refused, Connection Not Allowed"). However, if the connection is allowed, then the method 1410 enters a permission block 1426 that permits the service (i.e., one of the services 500) connection to the data source connection 660.

An exemplary core administration module can enforce compliance with a specification. More specifically, with the foregoing abstractions and organization, a data center can be managed in a manner (e.g., in an automatic fashion, without any operator intervention) that guarantees that the specification set is internally consistent and that the properties in the property set are not violated are maintained.

Such guarantees can be automated with a two-step approach. First, as much as possible, the specifications and properties can be statically checked whenever a change is made to configuration of a data center. Since code that implements a service (while the term "service" makes this discussion more concrete, the same process applies to most any data center entity) may violate a formal specification, static checking may require static analysis tools that verify the properties of the implementation itself and determine automatically that the code obeys the specification. Such an analysis is easier to do if the code that implements the service is written in a type-safe programming language executing in a managed runtime (such as C#/CLR). In some instances, it may not be possible for static analysis to guarantee that the service implementation conforms to the specification, in which case, the specification can be enforced with checks at runtime.

Referring again to the system 1400 and method 1410, if a service is written in C or C++, it may be difficult to determine if that code ever establishes a TCP connection with a port on some other computer in the data center. If this is the case, runtime enforcement would require that whenever that service attempted to make a connection by issuing the CA API call 501, the target of the connection would be checked to determine if it was in the list of allowed connections 460 as specified by the service specification. If the target was not on the list, the connection would be refused and the service may fail (see, e.g., send block 1430). Operators observing this failure would either have to modify the specification of the service, or modify the implementation of the service before it would be allowed to execute.

In an exemplary data center, isolation between services, etc. can be enforced via a specification and can be optionally enforced with hardware support in the form of firewalls. Noting that with a well-defined specification, the implementation of inter-service isolation can be implemented with a combination of hardware, software runtime checks, and through static analysis. Moreover, because the specifications and properties can be formally defined, more complex isolation guarantees can be confidently specified and automatically enforced than is possible using operator-configured firewall isolation techniques.

Figure 5:
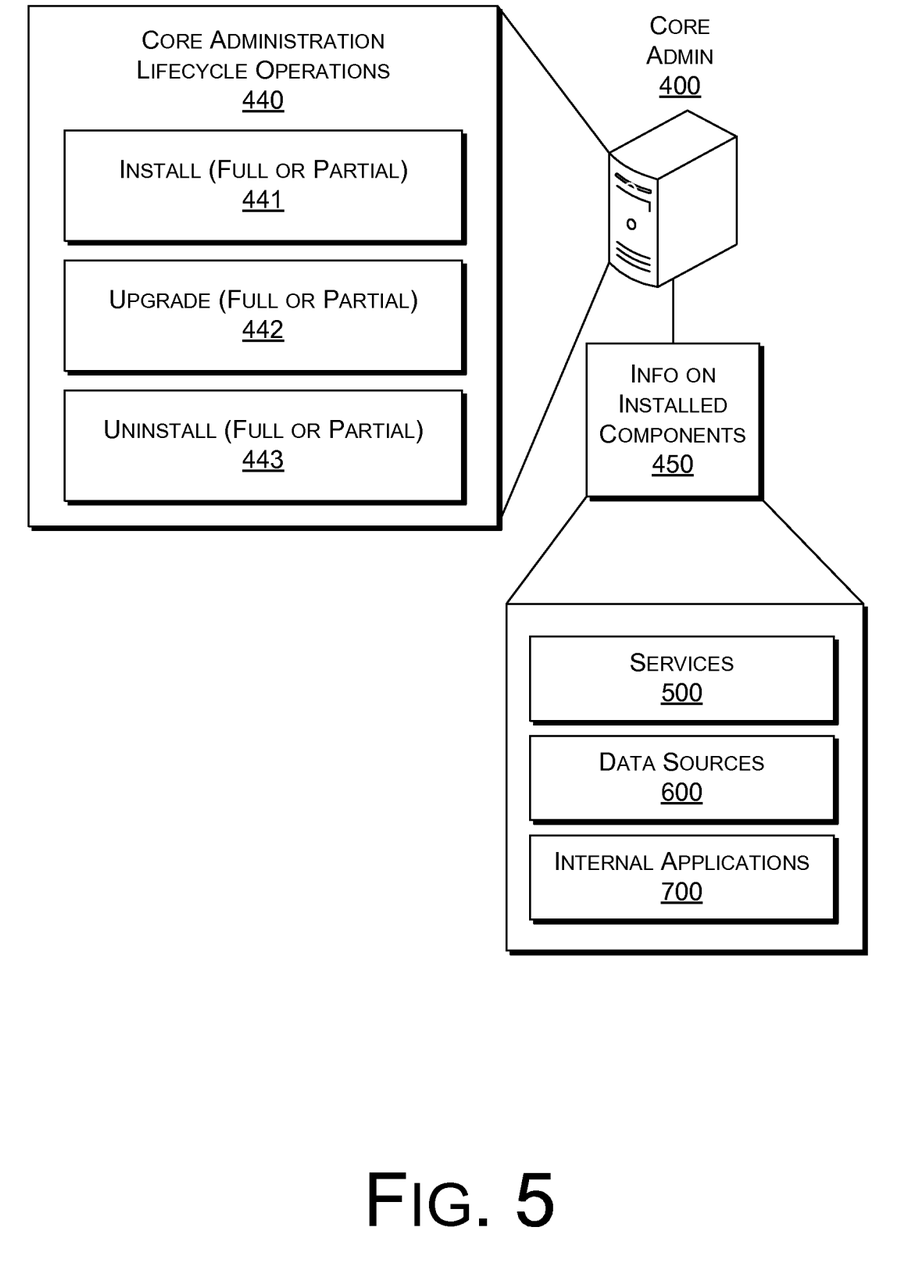
FIG. 5 is a block diagram of an exemplary lifecycle operations administered by a core administration module.

As mentioned, an exemplary core administration module 400 provides for partial operations. FIG. 5 shows an exemplary core administration module 400 with a core administration lifecycle operations component 440. This component may include an install module 441, an upgrade module 442 and an uninstall module 443. As indicated in FIG. 5, each of these modules may provide for partial operations, for example, the install module 441 may install a service in less than all machines in a data center. In addition, the core administration module 400 includes an information store 450 that maintains information on installed components such as services 500, data sources 600 and internal applications 700. For example, if a call is made to the upgrade module 442 of the core administration module 400 to upgrade one of the services 500, then the core administration module 400 may consult the information 450 to determine the extent of current installation of the service as well as how the service relies on the specification. With respect to the latter, upon installation of a service, the core administration module 400 can perform a check and the results of this check may be stored to indicate what portions of the specification were relied on by the service.

The arrangement of FIG. 5 relies on well-defined abstractions for various data center entities where the core administration module 400 controls these entities. In such an arrangement, it is possible to more precisely define and check whether the entities meet a declarative specification.

With respect to a lifecycle, the lifecycle of an entity can include an initial introduction (installed), modification (upgrade) and removal (uninstalled). Because data centers offer services and data sources to a large number of clients simultaneously, the "partial" modifier is added to the lifecycle abstractions (e.g., to define partial install, partial upgrade, and partial uninstall). An entity is partially installed when it is made available in the data center only to a fraction of the total number of data center clients. Often, data centers deploy upgrades by offering new services to only a fraction of their clients, for example, as a form of beta-testing. Partial upgrades are well-defined abstractions that can be reasoned about in specifications, just as regularly installed applications can.

Installing a service, data source, or internal application requires making that entity known to the core administration module and providing a specification for it which describes how it interacts with other parts of the data center (what its dependencies are). When a service or other entity is upgraded, its specification may change, and just as with an installation, the data center specification set can (or must) be checked to make sure that the rest of the data center remains consistent and the properties hold before the upgrade is allowed to proceed.

When an entity is uninstalled, the data center specification set can (or must) be checked again to ensure that removing the entity (for example a data source) does not violate any other specifications or properties. For example, removing a data source that other services use should not be allowed as the other services would fail to function without the data source present.

Figure 6:
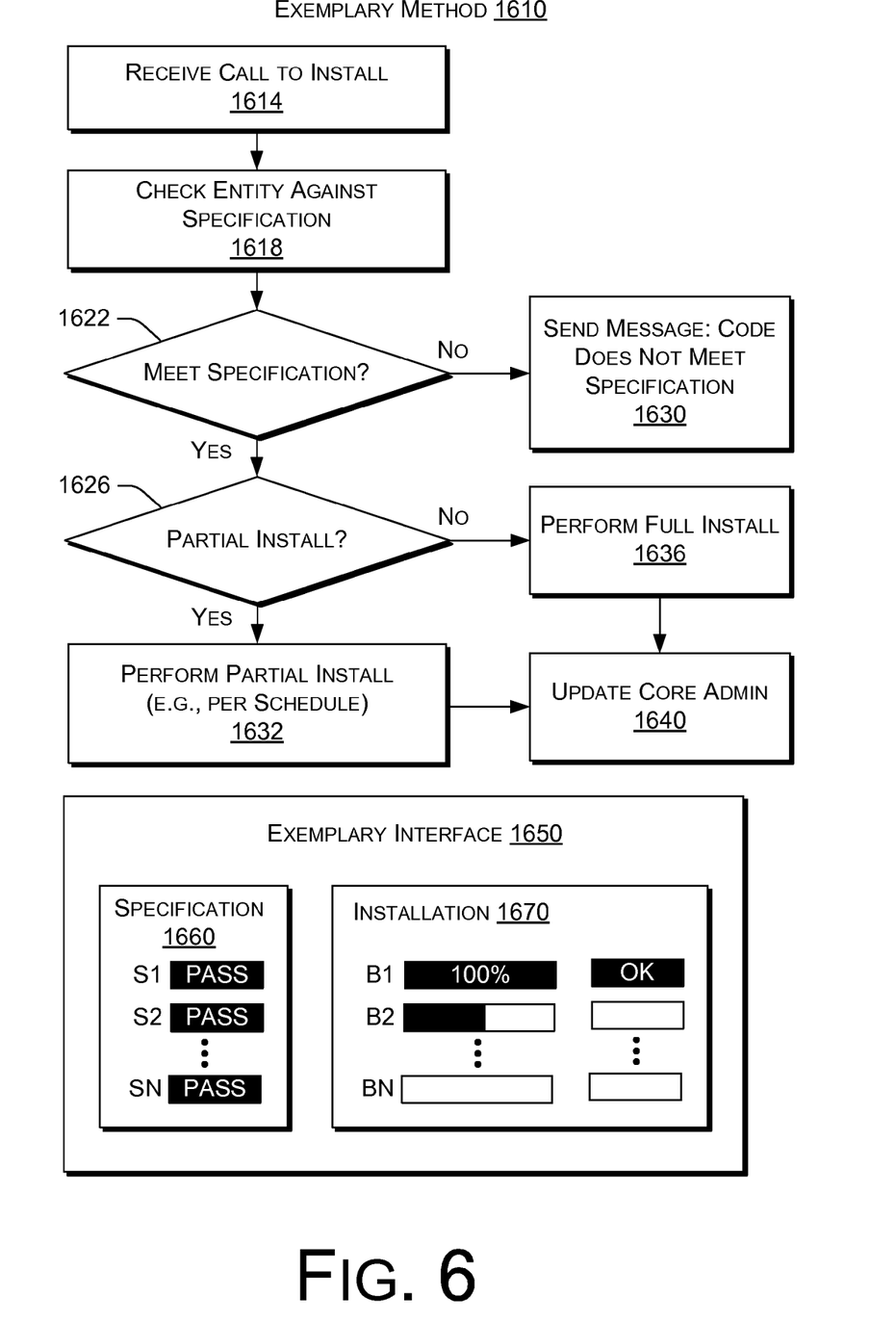
FIG. 6 is a block diagram of an exemplary method and interface (e.g., GUI) for a full install or a partial install of a service on a data center.

FIG. 6 shows an exemplary method 1610 and an exemplary interface 1650 for installation of an entity. The method 1610 commences in a reception block 1614 where a core administration module receives a call to install an entity. A check block 1618 checks the entity against the specification. Next, a decision block 1622 decides if the entity meets the internal specification of the data center. If the entity does not meet the specification, then the method 1610 proceeds to a send block 1630 that sends a message, for example, "code does not meet specification", which may include reasons why.

If the decision block 1622 decides that the entity does meet the specification, then the method 1610 continues in another decision block 1626 that decides if partial installation is desired. If not, then the method 1610 continues in a performance block 1636 that performs a full installation of the entity. If a partial installation is desired, then another performance block 1632 performs a partial installation of the entity. A partial installation may occur based on a schedule (e.g., time, event, etc.) or information provided in a call to install. In either instance, the method 1610 can continue at an update block 1640 that updates a core administration module. For example, referring to FIG. 5, the method 1610 can update the information 450 for the core administration module 400.

The exemplary interface 1650 includes a specification graphic 1660 and an installation graphic 1670. The specification graphic 1660 indicates whether the entity passed certain requirements (e.g., S1, S2, . . . SN) of the specification and the installation graphic 1670 indicates progress of installation (e.g., on blocks B1, B2, . . . , BN) and whether installation occurred without error.

Figure 7:
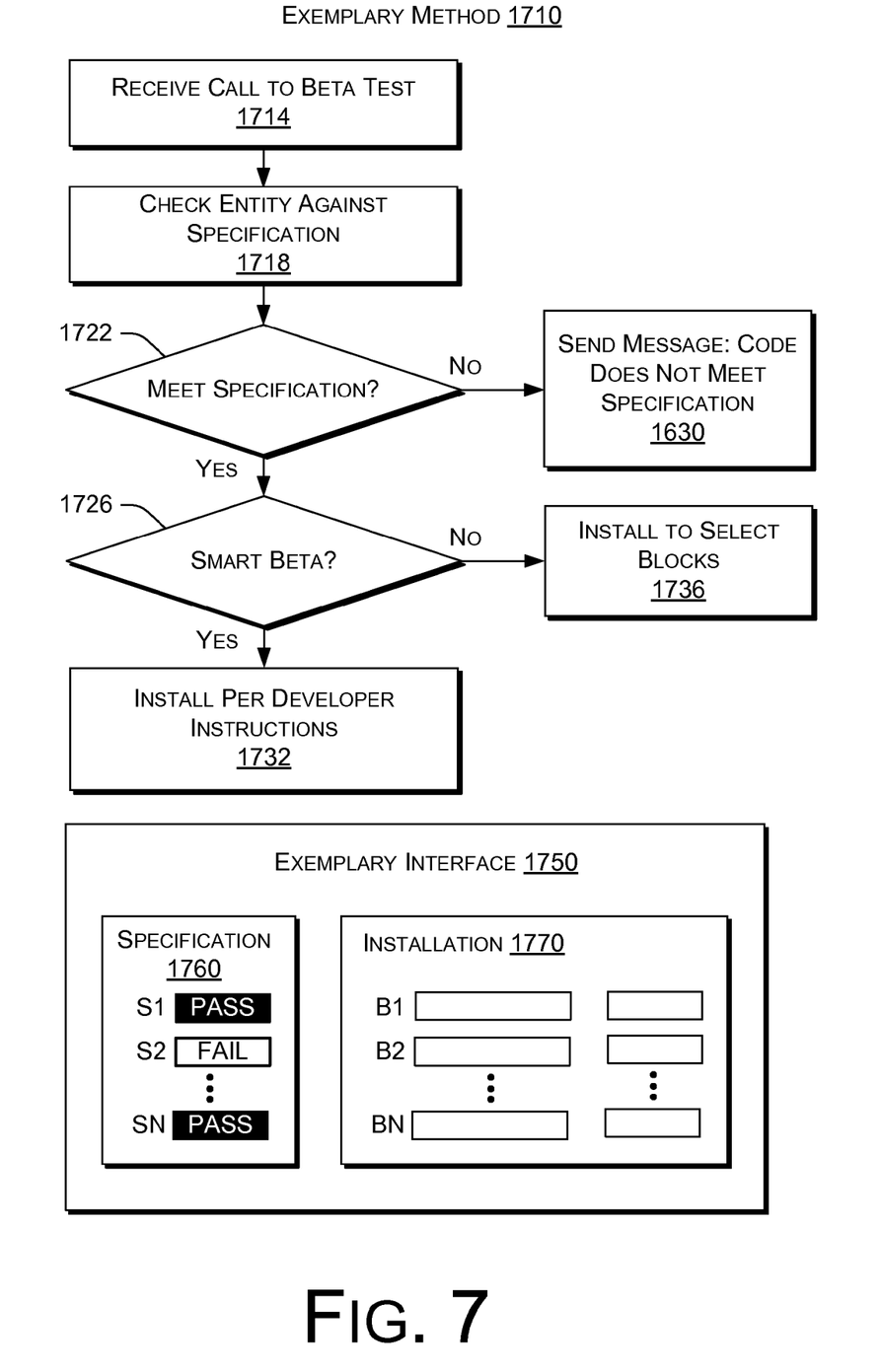
FIG. 7 is a block diagram of exemplary method and interface (e.g., GUI) for a beta test installation of a service (e.g., upgrade) on a data center.

FIG. 7 shows an exemplary method 1710 and an exemplary interface 1750 for a beta test. The method 1710 commences in a reception block 1714 where a core administration module receives a call to install an entity for purposes of a beta test. A check block 1718 checks the entity against the specification. Next, a decision block 1722 decides if the entity meets the internal specification of the data center. If the entity does not meet the specification, then the method 1710 proceeds to a send block 1730 that sends a message, for example, "code does not meet specification", which may include reasons why.

If the decision block 1722 decides that the entity does meet the specification, then the method 1710 continues in another decision block 1726 that decides if the beta test is relying on a "smart beta" feature of the core administration module. For example, a smart beta feature may preferentially install beta test code on particular machines where the machines may have similarities or differences that can help a tester assess beta performance. A smart beta feature may also install beta test code based in part on usage information. For example, where high traffic volume is desired, the core administration module can install beta test code on high volume machines or where slower testing is desired, the beta test code may be installed on lower volume machines.

If smart beta is not desired, then the method 1710 continues in an installation block 1736 that installs the beta entity, for example, to some select server blocks (less than all server blocks). If a smart beta installation is desired, then another installation block 1732 installs the beta entity according to some developer instructions or other "smart" criteria. In either instance, a beta is typically not a fully installed and a partial beta installation may occur based on a schedule (e.g., time, event, etc.) or information provided in a call to install.

The exemplary interface 1750 includes a specification graphic 1760 and an installation graphic 1670. The specification graphic 1660 indicates whether the beta entity passed certain requirements (e.g., S1, S2, . . . SN) of the specification and the installation graphic 1770 indicates progress of installation (e.g., on blocks B1, B2, . . . , BN) and whether installation occurred without error. In the example of FIG. 7, the specification graphic 1760 indicates that the beta entity did not pass part of the specification check. Hence, as indicated by the installation graphic 1770, installation of the beta entity did not occur.

FIG. 8 shows an exemplary method 1810 and an exemplary interface 1850 for uninstallation of a service. The method 1810 commences in a reception block 1814 where a core administration module receives a call to uninstall a service. A decision block 1816 decides whether uninstallation is possible. For example, where uninstallation may cause an issue with one or more other installed components, uninstallation may be prohibited or, as shown, an alert block 1817 may issue an alert to an administrator indicating that uninstall should not occur or that if uninstall occurs, certain issues may arise (e.g., error reporting, etc.). If the decision block 1816 decides that the requested uninstall is possible, then the method 1810 continues at a check block 1818.

The check block 1818 checks the specification information of the service, for example, as generated during installation and/or upgrade. Next, an uninstallation block 1822 uninstalls the service based at least in part on the specification information.

A decision block 1826 decides whether to revert the data center to a prior configuration, for example, according to configuration information about the uninstalled service. If the decision block 1826 decides to not revert, then an update block 1834 updates the configuration noting that the service has been uninstalled and that, for example, certain resources may be available or not available.

If the decision block 1826 decides to revert to a prior configuration, then a reversion block 1830 performs the reversion. Depending on history of the service (e.g., installation, upgrade, prior uninstallion, etc.), the reversion may be straightforward or more complex. Reversion may consider information about other entities that have been installed, upgraded and/or uninstalled.

The exemplary interface 1850 includes a configuration graphic 1860 and an uninstallation graphic 1870. The configuration graphic 1860 lists a series of configurations, which may be a set of configuration states, historical configurations, predicted optimal configurations, etc. The uninstallation graphic 1870 indicates progress of installation (e.g., on blocks B1, B2, . . . , BN) and whether uninstallation occurred without error and/or whether uninstallation was necessary (e.g., a partially installed service).

Various exemplary techniques described herein focus on data center properties that represent isolation guarantees and other correctness properties. Data center management based on declarative specifications can be optionally automatically re-provisioned based on configuration information. For example, when a new service is added to a data center that puts a large load on an existing data source, with a declarative specification, a core administration module can have enough information to automatically scale up the hardware resources devoted to the shared data source.

As described with respect to FIG. 8, automatic re-configuration can occur after a service is uninstalled. Without a formal specification, it may not even be clear what data sources the service that is being uninstalled was using, or how much capacity that service was consuming from the data sources. However, with declarative specifications, dependences are explicit and automated decisions may be made by a core administrative module. Further, configuration information can be generated and stored when a service is installed, upgraded and/or uninstalled. As a result, when a service is uninstalled, a data center configuration can be reliably restored to a configuration it had before the service was installed.

Exemplary Computing Environment

FIG. 9 illustrates an exemplary computing device 900 that may be used to implement various exemplary components and in forming an exemplary system. For example, computing devices of the data center 300 of FIGS. 1 and 2 may include various features of the device 900.

In a very basic configuration, computing device 900 typically includes at least one processing unit 902 and system memory 904. Depending on the exact configuration and type of computing device, system memory 904 may be volatile (such as RAM), non-volatile (such as ROM, flash memory, etc.) or some combination of the two. System memory 904 typically includes an operating system 905, one or more program modules 906, and may include program data 907. The operating system 905 include a component-based framework 920 that supports components (including properties and events), objects, inheritance, polymorphism, reflection, and provides an object-oriented component-based application programming interface (API), such as that of the .NET™ Framework manufactured by Microsoft Corporation, Redmond, Wash. The device 900 is of a very basic configuration demarcated by a dashed line 908. Again, a terminal may have fewer components but will interact with a computing device that may have such a basic configuration.

Computing device 900 may have additional features or functionality. For example, computing device 900 may also include additional data storage devices (removable and/or non-removable) such as, for example, magnetic disks, optical disks, or tape. Such additional storage is illustrated in FIG. 9 by removable storage 909 and non-removable storage 910. Computer storage media may include volatile and nonvolatile, removable and non-removable media implemented in any method or technology for storage of information, such as computer readable instructions, data structures, program modules, or other data. System memory 904, removable storage 909 and non-removable storage 910 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media may be part of device 900. Computing device 900 may also have input device(s) 912 such as keyboard, mouse, pen, voice input device, touch input device, etc. Output device(s) 914 such as a display, speakers, printer, etc. may also be included. These devices are well know in the art and need not be discussed at length here.

Computing device 900 may also contain communication connections 916 that allow the device to communicate with other computing devices 918, such as over a network. Communication connections 916 are one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A system comprising:
a processor;
memory coupled to the processor:
a data center core administration module maintained on the memory and executed on the processor, the module comprising:
 a property set;
 a formal specification set including a dependency of a service or a behavior of the service; and
 logic to install the service and to upgrade the service in a data center, wherein the service or upgrade of the service is required to comply with the property set and the formal specification set prior to installation of the service or upgrade of the service in the data center.

2. The system of claim 1 further comprising logic to partially install a service in the data center.

3. The system of claim 2 wherein the service comprises a test version of the service.

4. The system of claim 1 further comprising logic to partially upgrade a service in the data center.

5. The system of claim 4 wherein the service comprises a test version of the service.

6. The system of claim 1 wherein the logic responds to application programming interface calls to install a service and to upgrade a service.

7. The system of claim 1 wherein the property set comprises properties to limit access by a service to a resource in a data center.

8. The system of claim 1 wherein the property set comprises properties to ensure data integrity in a data center based at least in part on limiting or prohibiting inter-data center writing of data.

9. The system of claim 1 wherein the formal specification set comprises specifications to match services and data sources.

10. The system of claim 1 further comprising logic to store a data center configuration after installation of a service or after upgrade of a service.

11. The system of claim 1 further comprising logic to uninstall a service, logic to store a data center configuration and logic to revert to a stored data center configuration after uninstallation of a service.

12. The system of claim 1 further comprising logic to perform service runtime checks against the specification set.

13. A system comprising:
a processor;
memory coupled to the processor:
a data center architecture implemented in software stored in the memory and executed on the processor, the data center architecture comprising:
 a services abstraction;
 a data sources abstraction;
 an internal applications abstraction; and
 a core administration abstraction for static and dynamic enforcement of data center polices based on compliance with a formal specification set or a combination of a property set and a formal specification set, wherein the core administration abstraction is configured to consult the services abstraction, the data sources abstraction, and the internal applications abstraction to determine data center information, wherein the static and dynamic enforcement of the data center polices comprises evaluating an entity for compliance with the formal specification set or the combination of the property set and the formal specification set; and limiting access to resources or installation of the entity in response to determining that the entity does not comply with the formal specification set or the combination of the property set and the formal specification set.

14. The system of claim 13 wherein the formal specification set comprises specifications to match services and data sources.

15. A method for updating a data center, the method comprising:
receiving a request for a service to be uninstalled, the service conforming to a formal specification set;
determining whether uninstallation of the service is permitted;
accessing, in the formal specification set, information related to the service to be uninstalled;
uninstalling the service based at least in part on the information in the formal specification set;
determining whether to revert the system to a stored prior configuration; and
in response to determining that the system is not to be reverted to the stored prior configuration, re-configuring the system using the formal specification set to generate and store re-configuration information, the re-configuration information comprising updated configuration information conforming to the formal specification set where the service to be uninstalled is uninstalled.

16. The method of claim 15 wherein the method further comprises reverting the system to the stored prior configuration by using stored configuration information.

17. The system of claim 13 wherein, the data center information comprises an extent of an installation of a service or a reliance of the service on the formal specification.

18. The system of claim 13 wherein the property set comprises:
properties to limit access by a service to a data resource in a data center; and properties to ensure data integrity in the data center based at least in part on limiting inter-data center writing of data.

* * * * *